Aug. 15, 1944.   O. W. KOEPP   2,355,805
ANTIFRICTION BEARING SHIELD
Filed April 22, 1943
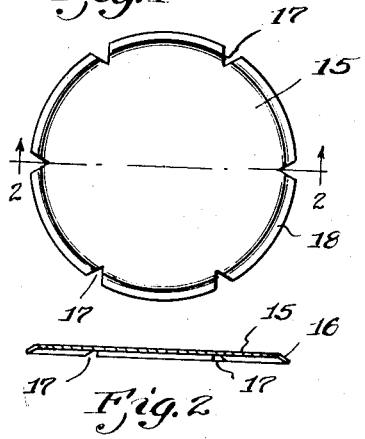
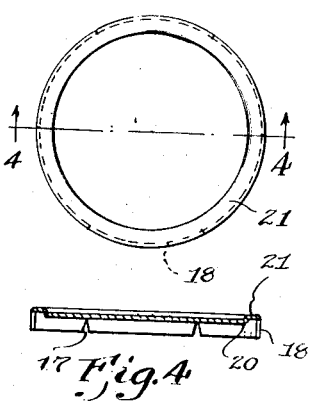
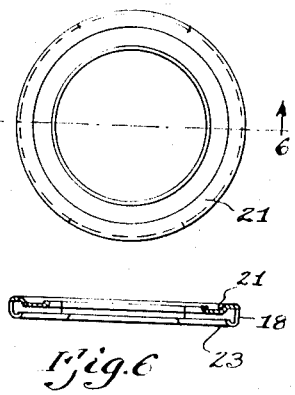
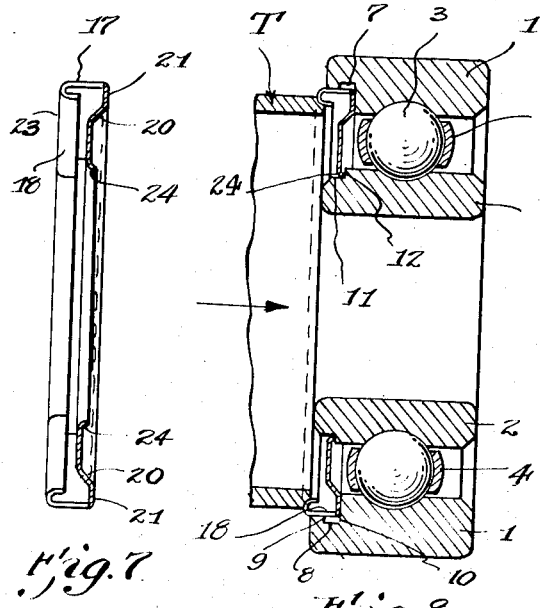
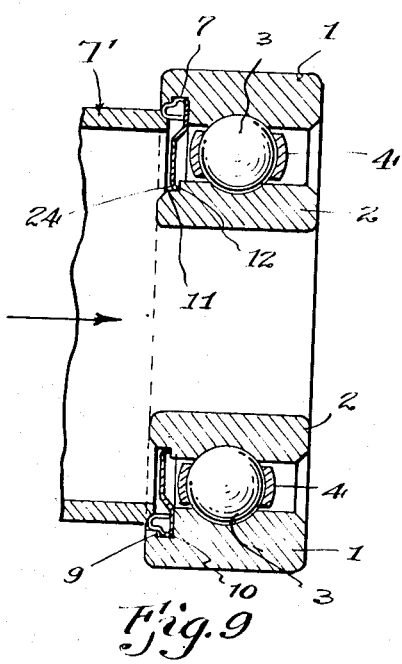
INVENTOR.
Orville W. Koepp
BY Barnes, Kisselle, McLaughlin & Raisch
Attorneys.

Patented Aug. 15, 1944

2,355,805

UNITED STATES PATENT OFFICE 2,355,805

ANTIFRICTION BEARING SHIELD

Orville W. Koepp, Ann Arbor, Mich., assignor to Hoover Ball & Bearing Company, Ann Arbor, Mich., a corporation of Michigan Application April 22, 1943, Serial No. 483,999

5 Claims. (Cl. 308—187.2)

In anti-friction bearings having an outer race and an inner race with rolling elements therebetween, it is often desirable to have a shield for closing the space between the races on one or both sides of the rolling elements. While such a shield may not necessarily be a complete seal for retaining lubricant within the bearing or for excluding the entry of dust or other extraneous material, it offers a covering and serves to keep out larger particles of extraneous material.

Such a shield may and usually does comprise an annulus of sheet metal somewhat in the nature of a washer which has one peripheral edge securely mounted upon one race and which has its other peripheral edge arranged with a running fit with the other race. Heretofore, the peripheral edge which is fixedly mounted upon one race-way has been press fitted or expanded into a groove in the race, and this presents difficulty as set forth below.

The requirements for accuracy in such anti-friction bearings have become very exacting. In the making of the bearing the races are formed and in this formation the groove for receiving the shield is machined into the stock of the race member. After this initial formation of the race member it is hardened or heat treated, and in this step of the process the race member is often thrown into an out-of-round condition. This condition is, of course, corrected in so far as the race-way for the rolling elements is concerned, by finishing operations. But the groove to receive the shield is not so finished because it is not a surface which is to have any running movement therein, and the result is that the peripheral surface of the groove may remain slightly out-of-round or, in other words, in a condition where the diameter measured across the peripheral surface is slightly less in some one or more locations than it is in other one or more locations. Now when the peripheral edge of the shield is expanded or pressed into such a groove the shield will engage those locations on a short diameter with greater pressure than those locations on a longer diameter with the result that the pressure is not uniform throughout the circumference. In other words, the shield subjects the race to greater pressure at the high points than at the low points. The shield is ordinarily attached to the outer race with the result that the outward or expanding forces against the high points of the peripheral surface of the groove tends to flex the race outwardly so as to cause it to exceed the maximum permissible tolerance. Indeed it has been found that a finished bearing which may check satisfactorily shortly after it is made will be rejected after a period of time, as for example, if the bearing is placed in stock for a while before it is used. The tolerances permitted are so close that even the expansion which occurs with the bearing lying on the shelf, so to speak, is sufficient to cause it to be rejected.

The principal object of the invention is to provide a bearing shield which can be expanded into the groove of a race member, but in which the construction is such as to so minimize or eliminate unequal radial pressure or forces that the race will not be thrown into an out-of-round condition even though the shield is expanded against the out-of-round peripheral surface of the groove. It is a further object to provide a construction wherein a bearing which is once checked and found to be satisfactory will remain in such condition due to the substantial absence or minimizing of unequal radial pressures caused by the shield. To this end the shield is provided with a bead-like formation to be expanded into the groove of the race; and this bead is so constructed that its arch or circular form is broken up into segments, and thus the normally strong condition of a circular bead is removed. The bead is segmented so that it is broken up into separate portions each normally acting individually. As a result, a segment or a portion of a segment which is expanded against a high spot of the peripheral surface of the groove may flex independently of other segments. Accordingly, one segment does not gain strength by an integral connection to other segments. Even though the expanded edge of the shield is segmented, the arrangement nevertheless, provides a sealing contact between a segmented edge and the race to which it is connected.

A structure for carrying out the invention is shown in the accompanying drawing.

Fig. 1 is an elevational view of a blank from which the shield can be made.

Fig. 2 is a cross sectional view taken substantially on line 2—2 of Figure 1.

Fig. 3 is a side elevational view showing the blank following an operation thereon.

Fig. 4 is a sectional view taken substantially on line 4—4 of Fig. 3.

Fig. 5 is an elevational view of the finished shield prior to mounting in the bearing.

Fig. 6 is a cross-sectional view taken substantially on line 6—6 of Figure 5.

Fig. 7 is an enlarged cross-sectional view similar to Figure 6 showing the shield prior to its mounting in a bearing.

Fig. 8 is a cross-sectional view through an anti-friction bearing of the ball type showing the shield inserted but prior to the operation of finally mounting the shield.

Fig. 9 is a cross-sectional view similar to Figure 8 showing the shield in its final position as mounted on the outer race of an anti-friction bearing.

The anti-friction bearing with which the shield may be used may be any one of several different types, but as shown in Figs. 8 and 9, the bearing has an outer race 1 and an inner race 2 and between the races are a series of rolling elements herein shown as in the form of balls 3. The balls function in suitable grooves or race-ways in the race members and the balls may be held properly spaced by a suitable retainer 4. This represents a well-known form of anti-friction bearing.

Where the shield is to be mounted on the outer race, the outer race is provided with an undercut groove 7 having a peripheral wall 8, a side wall 9 near the edge of the race, and an inner wall constituting an abutment 10. The inner race 2 has what may be termed an open groove with a circumferential outer face 11, and a face 12. The shield is to be connected to the outer race through means of the groove 7, while the shield has a running fit in the angle formed between surfaces 11 and 12 of the inner race.

The blank from which the shield may be made is illustrated at 15, and the first operations in the formation of the shield may reside in fashioning the peripheral portion of the blank into an angular form as shown in 16. The peripheral edge is segmented by cutting into the edge a number of notches as at 17. The number of notches may vary to meet different conditions, but in practice, for a bearing of average size, six notches have been found adequate, thus leaving six segments 18.

Subsequent operations fashion the blank into the form shown in Figs. 3 and 4 where the segmented edge is fashioned into a more abrupt angle relative to the plane of the blank, and the blank is depressed to provide an offset 20, thus providing a circumferential surface 21 lying in the plane of the blank. Following this the blank is further operated on to provide a reverse bend or roll 23 on the segments 18 and to cut out the center of the blank to give the same a washer-like formation as shown in Figs. 5, 6 and 7. The inner edge of the metal of the washer formation may be flared slightly as shown at 24.

The shield is now in its finished form and ready to be mounted on a bearing, it being understood, of course, that the final form or shape of the shield is modified when it is mounted on a bearing, as will be seen by comparison of Figs. 8 and 9.

The shield is disposed with respect to the bearing structure as illustrated in Fig. 8, with the annular surface 21 against the abutment 10. The overall diameter of the shield is such that it may pass through the opening defined by the shoulder 9. The inner edge 24 comes in close proximity with the surfaces 11 and 12, and thus has a running fit therewith.

A suitable tool is used to deform the bead-like formation of the outer peripheral edge of the shield, such a tool being illustrated at T. This tool, as shown, engages a roll formation 18, and then the tool is forced to the right as Fig. 8 is viewed and the roll formation is deformed. This causes the segments of the roll formation to expand into the groove 7 so that the shield is securely located in place behind the shoulder 9 with the surface 21 tightly engaged against the wall 10. The construction is such that after the shield is thus finally mounted a running fit exists between the edge 24 and the annular surfaces 11 and 12 of the inner race.

The segmental form of the peripheral bead is such that there remains a slight clearance in the notches 17 when the shield is in its form as shown at Figs. 5, 6 and 7. In fashioning the bead, the notches 17 which are originally of V-shape are partially closed. However, the notches should not be completed closed, else the segments may abut each other and become strengthened one from the other. A segment which is expanded against a high spot in the surface 8 of the groove is free to distort without hindrance or without a strengthening action from the adjoining segments, and the clearance at the notches is necessarily sufficient to permit this variation in the several segments. The segments which are expanded against the low spots of the surface 8 of the groove may be expanded outwardly slightly greater extent than those segments adjacent the high spots. But it will be seen that a measure of flexibility is provided and the arch construction or circumferential construction of the bead is broken up. As a result, each segment may be expanded against the circumferential wall 8 of the groove even though this wall is in the out-of-round condition above referred to. Accordingly, the radial or expanding pressure or forces on the race 1 are so reduced or minimized that the race retains substantially its original dimensions and is not flexed beyond the permissible tolerances.

I claim:

1. In a bearing having an outer race member and an inner race member, said members having a space therebetween, rolling bearing elements between the race members, the outer race member having an inwardly opening groove located to one side of the rolling elements, and a shield for closing the space between the race members comprising a washer-like member having a segmented beaded edge expanded into said groove.

2. In a bearing having an outer race member and an inner race member, said members having a space therebetween, rolling bearing elements between the race members, the outer race member having an inwardly opening groove located to one side of the rolling elements, and a shield for closing the space between the race members comprising a metal washer-like member, the outer peripheral edge of the member being turned upon itself to provide a hollow bead formation, said bead formation having a plurality of slots therein for dividing the bead formation into segments, said segmented bead formation being expanded into said groove.

3. In a bearing having an outer race member and an inner race member, said members having a space therebetween, rolling bearing elements between the race members, the outer race member having an inwardly opening groove located to one side of the rolling elements, a shield for closing the space between the race members comprising a washer-like member having a segmented beaded edge expanded in said groove, the inner race having intersecting angular surfaces providing an open groove formation, and the inner peripheral edge of the shield having a running fit therewith.

4. In a bearing having an outer race member and an inner race member, said members having a space therebetween, rolling bearing elements between the race members, the outer race member having an inwardly opening groove adjacent one side thereof and having an abutment disposed radially inwardly from the inner wall of the groove, a shield for closing the space between the race members comprising washer-like member, the outer peripheral edge of the shield being fashioned to provide a hollow bead formation which is flat on one side and which provides a radial flat face at the outer edge of the shield, said shield being disposed so that said flat face thereof lies against the abutment of the outer race, the hollow bead formation being segmented by a plurality of slots therein, and said segmented bead formation being expanded into said groove, the inner peripheral edge of the shield having a running fit with the inner race.

5. In a bearing having an outer race member and an inner race member, said members having a space therebetween, rolling bearing elements between the race members, one race member having a groove located at one side of the rolling elements and which opens into the said space, said one race member having an abutment inwardly of the groove, a shield comprising stock of sheet material of a washer-like formation, one peripheral edge of the shield having notches therein and being fashioned into hollow segmented bead form, said bead form being flat on one side and said flat side being disposed against said abutment, the segmented bead form being expanded into said groove to attach the shield to the grooved race member, the other peripheral edge of the shield having a running fit with the other race member.

ORVILLE W. KOEPP.